US010243218B2

(12) United States Patent
Iio et al.

(10) Patent No.: US 10,243,218 B2
(45) Date of Patent: Mar. 26, 2019

(54) METHOD FOR PRODUCING FINE CATALYST PARTICLES, METHOD FOR PRODUCING CARBON-SUPPORTED FINE CATALYST PARTICLES, METHOD FOR PRODUCING CATALYST MIX AND METHOD FOR PRODUCING ELECTRODE

(75) Inventors: Atsuo Iio, Susono (JP); Naoki Takehiro, Shizuoka-ken (JP); Tatsuya Arai, Susono (JP)

(73) Assignees: Toyota Jidosha Kabushiki Kaisha, Toyota-shi, Aichi (JP); Audi AG, Ingolstadt (DE)

( * ) Notice: Subject to any disclaimer, the term of this patent is extended or adjusted under 35 U.S.C. 154(b) by 135 days.

(21) Appl. No.: 13/982,782

(22) PCT Filed: Nov. 16, 2011

(86) PCT No.: PCT/JP2011/076441
§ 371 (c)(1),
(2), (4) Date: Nov. 26, 2013

(87) PCT Pub. No.: WO2012/105107
PCT Pub. Date: Aug. 9, 2012

(65) Prior Publication Data
US 2014/0178575 A1   Jun. 26, 2014

(30) Foreign Application Priority Data
Feb. 1, 2011   (JP) ................... 2011-020129

(51) Int. Cl.
*H01M 4/92* (2006.01)
*H01M 4/86* (2006.01)
(Continued)

(52) U.S. Cl.
CPC ......... *H01M 4/921* (2013.01); *H01M 4/8652* (2013.01); *H01M 4/8825* (2013.01);
(Continued)

(58) Field of Classification Search
CPC ... B01J 23/42; B01J 23/44; B01J 23/38; B01J 23/40; H01M 4/92; H01M 4/921;
(Continued)

(56) References Cited

U.S. PATENT DOCUMENTS 4,409,129 A * 10/1983 Takeuchi ................. B01J 23/42
   502/150
4,716,087 A   12/1987 Ito et al.
(Continued)

FOREIGN PATENT DOCUMENTS

DE   11 2010 005 593 T5   3/2013
DE   11 2010 005 260 T5   5/2013
(Continued)

OTHER PUBLICATIONS

International Search Report, dated Feb. 21, 2012, for International Application No. PCT/JP2011/076441, 2 pages.

*Primary Examiner* — Tabassom Tadayyon Eslami
(74) *Attorney, Agent, or Firm* — Finnegan, Henderson, Farabow, Garrett & Dunner, LLP

(57) ABSTRACT

An object of the present invention is to provide a method for producing fine catalyst particles, a method for producing carbon-supported fine catalyst particles, a method for producing a catalyst mix, and a method for producing an electrode, all of which are configured to inhibit, when used in fuel cells, etc., performance deterioration during operation at especially high temperature. Disclosed is a method for producing fine catalyst particles each comprising a core particle and an outermost layer, the core particle containing palladium and the outermost layer containing platinum and covering the core particle, the method comprising the steps of: preparing palladium-containing particles; preparing an acid solution configured to dissolve palladium more preferentially than platinum; covering each palladium-containing particle with an outermost layer containing platinum; and
(Continued)

bringing the palladium-containing particles each covered with the outermost layer into contact with the acid solution.

3 Claims, 5 Drawing Sheets

(51) Int. Cl.
*H01M 4/88* (2006.01)
*H01M 8/1018* (2016.01)

(52) U.S. Cl.
CPC ............. *H01M 4/92* (2013.01); *H01M 4/925* (2013.01); *H01M 4/926* (2013.01); *H01M 2008/1095* (2013.01)

(58) Field of Classification Search
CPC ........ H01M 4/88; H01M 4/8825; H01M 4/90; H01M 4/907; H01M 4/9082; H01M 4/82; H01M 4/926
USPC .......................................... 427/115
See application file for complete search history.

(56) References Cited

U.S. PATENT DOCUMENTS

| | | | |
|---|---|---|---|
| 6,187,468 B1 * | 2/2001 | Shinkai et al. | 429/481 |
| 2006/0093892 A1 | 5/2006 | Min et al. | |
| 2006/0135359 A1 * | 6/2006 | Adzic et al. | 502/326 |
| 2007/0031722 A1 | 2/2007 | Adzic et al. | |
| 2010/0048387 A1 | 2/2010 | Zhang et al. | |
| 2010/0092841 A1 | 4/2010 | Lopez et al. | |
| 2012/0010069 A1 | 1/2012 | Takehiro et al. | |
| 2012/0295172 A1 * | 11/2012 | Peled et al. | 429/418 |
| 2013/0059219 A1 | 3/2013 | Kimura et al. | |
| 2013/0177838 A1 * | 7/2013 | Wang et al. | 429/524 |

FOREIGN PATENT DOCUMENTS

| | | |
|---|---|---|
| JP | 2005-100713 | 4/2005 |
| JP | 2006-128117 A | 5/2006 |
| JP | 2007-134295 A | 5/2007 |
| JP | 2008-541399 | 11/2008 |
| JP | 2012-16684 | 1/2012 |
| WO | WO 2006/124248 A2 | 11/2006 |
| WO | WO 2011/099956 A1 | 8/2011 |

* cited by examiner

METHOD FOR PRODUCING FINE CATALYST PARTICLES, METHOD FOR PRODUCING CARBON-SUPPORTED FINE CATALYST PARTICLES, METHOD FOR PRODUCING CATALYST MIX AND METHOD FOR PRODUCING ELECTRODE

CROSS-REFERENCE TO RELATED APPLICATIONS

This application is a national phase application of International Application No. PCT/JP2011/076441, filed Nov. 16, 2011, and claims the priority of Japanese Application No. 2011-020129, filed Feb. 1, 2011, the content of both of which is incorporated herein by reference.

TECHNICAL FIELD

The present invention relates to a method for producing fine catalyst particles, a method for producing carbon-supported fine catalyst particles, a method for producing a catalyst mix, and a method for producing an electrode, all of which are configured to inhibit, when used in fuel cells, etc., performance deterioration during operation at especially high temperature.

BACKGROUND ART

In fuel cells, a fuel and an oxidant are supplied to two electrically-connected electrodes to electrochemically oxidize the fuel, thereby converting chemical energy directly to electrical energy. Unlike thermal power generation, fuel cells are not limited by the Carnot cycle; therefore, they show high energy conversion efficiency. A fuel cell generally comprise a stack of fuel cells, each having an electrolyte layer sandwiched by a pair of electrodes, that is, a membrane-electrode assembly as the basic structure.

Supported platinum and platinum alloy materials have been used as electrocatalysts for cathode and anode of fuel cells. However, such an amount of platinum as is necessary in the new cutting-edge electrocatalysts, is still too expensive to realize commercial mass production of fuel cells. Since noble metal unit cost has a large influence on catalyst price, a further increase in the activity per unit mass of noble metal is desired.

While platinum ions are eluted under a high potential environment, platinum ions are deposited under a low potential environment. Therefore, agglomeration of platinum particles occurs after high potential discharge and low potential discharge are repeated alternately. Such agglomeration of platinum particles causes a decrease in effective electrode area and contributes to a decrease in battery performance.

Previous studies aiming at increasing both catalytic activity and durability, include a study of electrocatalyst having a so-called core-shell structure. An electrocatalyst for fuel cells is disclosed in Patent Literature 1, in which an electroconductive carrier supports particles comprising a noble metal such as platinum and having a core-shell structure such that the core comprises at least a noble metal, such as platinum and the shell comprises a noble metal oxide and is formed around the core.

CITATION LIST

Patent Literature 1: Japanese Patent Application Laid-Open No. 2005-100713

SUMMARY OF INVENTION

Technical Problem

In Patent Literature 1, experimental results on the power generation performance of a membrane-electrode assembly are disclosed (paragraphs [0058] to [0064] and FIG. 3), in which the cathode contains the electrocatalyst for fuel cells disclosed in Patent Literature 1. In Patent Literature 1, however, there is no description of changes in power generation performance arising from changes in operating temperature.

The present invention was achieved in light of the above circumstance. An object of the present invention is to provide a method for producing fine catalyst particles, a method for producing carbon-supported fine catalyst particles, a method for producing a catalyst mix, and a method for producing an electrode, all of which are configured to inhibit, when used in fuel cells, etc., performance deterioration during operation at especially high temperature.

Solution to Problem

The method for producing fine catalyst particles according to the present invention, is a method for producing fine catalyst particles each comprising a core particle and an outermost layer, the core particle containing palladium and the outermost layer containing platinum and covering the core particle, the method comprising the steps of: preparing palladium-containing particles; preparing an acid solution configured to dissolve palladium more preferentially than platinum; covering each palladium-containing particle with an outermost layer containing platinum; and bringing the palladium-containing particles each covered with the outermost layer into contact with the acid solution.

In the method for producing the fine catalyst particles according to the present invention, preferably, the step of bringing the palladium-containing particles each covered with the outermost layer into contact with the acid solution, is conducted in a condition that the ratio of the mass $M_s$ of the outermost layers eluted by the acid solution divided by the mass $M_c$ of the palladium-containing particles eluted by the acid solution ($M_s/M_c$) is 0.4 to 2.0.

The first method for producing a catalyst mix according to the present invention, is a method for producing a catalyst mix comprising the fine catalyst particles produced by the above production method, the method comprising the steps of: preparing an electrolyte, and dispersing and mixing at least the electrolyte and the fine catalyst particles by means of a ball mill configured to use balls made of a material with a lower hardness than that of the material contained in the outermost layer.

The method for producing carbon-supported fine catalyst particles according to the present invention, is a method for producing carbon-supported fine catalyst particles each comprising a core particle and an outermost layer, the core particle containing palladium and the outermost layer containing platinum and covering the core particle, the method comprising the steps of: preparing palladium-containing particles each supported by a carbon carrier; preparing an acid solution configured to dissolve palladium more preferentially than platinum; covering each palladium-containing particle supported by the carbon carrier with an outermost layer containing platinum; and bringing the palladium-containing particles each supported by the carbon carrier and covered with the outermost layer into contact with the acid solution.

In the method for producing the carbon-supported fine catalyst particles according to the present invention, preferably, the step of bringing the palladium-containing particles each supported by the carbon carrier and covered with the outermost layer into contact with the acid solution, is conducted in a condition that the ratio of the mass $M_s$ of the outermost layers eluted by the acid solution divided by the mass $M_c$ of the palladium-containing particles eluted by the acid solution ($M_s/M_c$) is 0.4 to 2.0.

The second method for producing a catalyst mix according to the present invention, is a method for producing a catalyst mix comprising the carbon-supported fine catalyst particles produced by the above production method, the method comprising the steps of: preparing an electrolyte, and dispersing and mixing at least the electrolyte and the carbon-supported fine catalyst particles by means of a ball mill configured to use balls made of a material with a lower hardness than that of the material contained in the outermost layer.

The electrode production method of the present invention is a method for producing an electrode comprising an electrocatalyst layer and a gas diffusion layer, the electrocatalyst layer comprising carbon-supported fine catalyst particles each comprising a core particle and an outermost layer, the core particle containing palladium and the outermost layer containing platinum and covering the core particle, the method comprising the steps of: preparing palladium-containing particles each supported by a carbon carrier; preparing an acid solution configured to dissolve palladium more preferentially than platinum; preparing a gas diffusion sheet; covering each palladium-containing particle supported by the carbon carrier with an outermost layer containing platinum; forming an electrocatalyst layer on the gas diffusion sheet, the electrocatalyst layer comprising the palladium-containing particles each supported by the carbon carrier and covered with the outermost layer; and bringing at least the electrocatalyst layer into contact with the acid solution.

In the electrode production method of the present invention, preferably, the step of bringing the electrocatalyst layer into contact with the acid solution, is conducted in a condition that the ratio of the mass $M_s$ of the outermost layers eluted by the acid solution divided by the mass $M_c$ of the palladium-containing particles eluted by the acid solution ($M_s/M_c$) is 0.4 to 2.0.

Advantageous Effects of Invention

According to the present invention, by treating in advance fine catalyst particles having a defective platinum covering with acid solution, only such defective particles can be dissolved and removed; therefore, when the acid-treated fine catalyst particles are used in the electrocatalyst of a fuel cell, there is no possibility of palladium elution during operation, and it is possible to inhibit a decrease in fuel cell performance.

DESCRIPTION OF EMBODIMENTS

Figure 1:
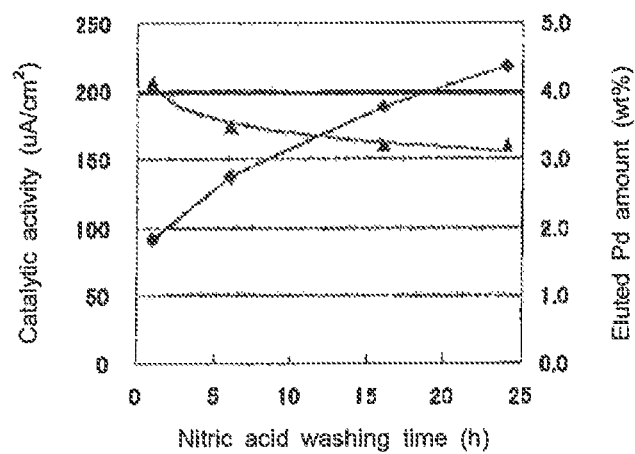
FIG. 1 is a graph showing the catalytic activity and the eluted palladium amount for the acid-treated carbon-supported fine catalyst particles of each of Examples 1 and 2 and Comparative Examples 1 and 2.

1. Method for Producing Fine Catalyst Particles

The method for producing fine catalyst particles according to the present invention is a method for producing fine catalyst particles each comprising a core particle and an outermost layer, the core particle containing palladium and the outermost layer containing platinum and covering the core particle, the method comprising the steps of: preparing palladium-containing particles; preparing an acid solution configured to dissolve palladium more preferentially than platinum; covering each palladium-containing particle with an outermost layer containing platinum; and bringing the palladium-containing particles each covered with the outermost layer into contact with the acid solution.

Electrocatalysts for fuel cells are disclosed in claims 3 and 4 of the above-mentioned patent literature 1, in which a platinum oxide is used in the shell and palladium, which is more soluble than platinum, is used in the core. As a result of researches, the inventors of the present invention have found that in such a catalyst that the core is more soluble than the shell, if there is a part not covered with the shell on the core (hereinafter such a part may be referred to as defective part), components constituting the core are eluted through the defective part.

The inventors of the present invention carried out further researches on the catalyst disclosed in Patent Literature 1 and have found that the amount of the palladium used in and eluted from the core is increased by an increase in operating temperature. For example, when the eluted palladium amount is increased by operation at a high temperature of 80° C., a lot of palladium ions are retained in the catalyst layer to be deposited on the shell surface. As a result, when a fuel cell comprising the catalyst disclosed in Patent Literature 1 is operated at high temperature, there is a problem such that the fuel cell shows lower performance than in the case of being used at low temperature.

As a result of diligent researches, the inventors of the present invention have found that by acid washing in advance the fine catalyst particles each comprising a core particle and an outermost layer, the core particle containing palladium and the outermost layer containing platinum and covering the core particle, it is possible to inhibit an increase in proton resistance and at the same time to inhibit a decrease in voltage, when the fine catalyst particles are used in a fuel cell, the decrease being associated with rising temperature. Also, the inventors have found that by acid washing in advance an electrocatalyst layer comprising the fine catalyst particles, it is possible to inhibit a decrease in voltage when an electrode comprising the electrocatalyst layer is used in a fuel cell, the decrease being attributed to rising temperature. Based on the knowledge, the inventors completed the present invention.

The present invention comprises the steps of: (1) preparing palladium-containing particles; (2) preparing an acid solution; (3) covering each palladium-containing particle with an outermost layer containing platinum; and (4) bringing the palladium-containing particles each covered with the outermost layer into contact with the acid solution. The present invention is not limited to these four steps. For example, it may comprise a drying step as described below, a supporting step, etc., besides the four steps.

Hereinafter, the steps (1) to (4) and other steps will be described in order.

1-1. Step of Preparing the Palladium-Containing Particles

As the palladium-containing particles, there may be used those synthesized in advance or those commercially available. In the present invention, the term "palladium-containing particles" is a general term for palladium particles and palladium alloy particles.

As described below, the outermost layer contains platinum. Platinum has excellent catalytic activity. Especially, it has excellent oxygen reduction reaction (ORR). While platinum has a lattice constant of 3.92 Å, palladium has a lattice constant of 3.89 Å, which is a value that is in the range of ±5% of the lattice constant of platinum. Therefore, no lattice mismatch occurs between platinum and palladium, so that palladium is sufficiently covered with platinum.

Examples of metal components contained in palladium alloy particles other than palladium, include iridium, ruthenium, gold, cobalt and nickel.

The average particle diameter of the palladium-containing particles is not particularly limited as long as it is equal to or less than the average particle diameter of fine catalyst particles described below. The average particle diameter of the palladium-containing particles is preferably 4 to 40 nm, particularly preferably 5 to 10 nm, from the point of view that the ratio of the surface area per palladium-containing particle to the cost per palladium-containing particle, is high.

The average particle diameter of the particles used in the present invention is calculated by an ordinary method. An example of the calculation method is as follows. First, a particle is picked up from particles shown in a transmission electron microscope (TEM) image at a magnification of 400,000× or 1,000,000×. Then, assuming that the particle is a sphere particle, the particle diameter is calculated. Such a particle diameter calculation by the TEM observation is performed on 200 to 300 particles of the same type, and the average of the particles is used as the average particle diameter.

1-2. Step of Preparing the Acid Solution

The acid solution used in the present invention is an acid solution configured to dissolve palladium more preferentially than platinum.

In general, the solubility of simple metal is determined by the ionization tendency of the metal, that is, by the standard electrode potential $E^0$ of the metal (more specifically, the electrode potential in an aqueous solution at 25° C. and pH=0). While the standard electrode potential of palladium, $E^0_{Pd}$, is +0.915 V (vs. SHE), the standard electrode potential of platinum, $E^0_{Pt}$, is +1.188 V (vs. SHE). Therefore, the ionization tendency of palladium is higher than that of platinum.

However, the ionization tendency determined by the standard electrode potential $E^0$ is limited to the tendency obtained in an aqueous solution at 25° C. and pH=0. The particles to be subjected to the acid treatment are fine particles or the like having a diameter of a few nanometers. Actually, therefore, it is not always possible to selectively elute palladium at the above potential, rather than platinum, depending on the treatment condition such as temperature or acid concentration.

The acid solution prepared in this step is an acid solution which has oxidation power that is sufficient to dissolve palladium and which is able to minimize platinum elution. In particular, the acid solution is preferably such that the oxidation-reduction potential is a value that is around the palladium elution potential, which is 0.915 V (vs. SHE), and less than the platinum elution potential, which is 1.188 V (vs. SHE).

Concrete examples of the acid solution prepared in this step include nitric acid, sulfuric acid, perchloric acid, hydrochloric acid and hypochlorous acid.

From the viewpoint of having oxidation power that is sufficient to dissolve palladium, nitric acid is particularly preferred. The concentration and atmospheric control by bubbling of the acid solution can be adjusted appropriately, depending on the type of the acid.

As just described, since the acid solution used in the acid solution treatment is a solution which can selectively dissolve palladium rather than platinum, the outermost layer containing platinum is not damaged in the acid solution treatment described below.

1-3. Step of Covering Each Palladium-Containing Particle with the Outermost Layer Containing Platinum The step of covering each palladium-containing particle with the outermost layer containing platinum, may be done in one-step reaction or may be done in multiple-step reactions.

Hereinafter, an example of the covering of the palladium-containing particles will be explained, in which each palladium-containing particle is covered with the outermost layer in two-step reactions.

As the step of covering each palladium-containing particle with the outermost layer in two-step reactions, for example, there may be mentioned one comprising at least a step of covering each palladium-containing particle with a monatomic layer and a step of replacing the monatomic layer with the outermost layer containing platinum.

A concrete embodiment of such an example is a method in which a monatomic layer is formed in advance on the surface of the palladium-containing particles by underpotential deposition; thereafter, the monatomic layer is replaced with the outermost layer. The underpotential deposition is preferably Cu-UPD.

Particularly in the case of using a platinum layer as the outermost layer, fine catalyst particles with a high surface coverage of platinum and excellent durability can be produced by Cu-UPD.

Hereinafter, a concrete example of Cu-UPD will be explained.

First, a powder of palladium supported by an electroconductive carbonaceous material (hereinafter referred to as Pd/C) is dispersed in water and filtrated to obtain a Pd/C paste. The paste is applied to the working electrode of an electrochemical cell. The Pd/C paste can be attached to the working electrode by means of an electrolyte such as Nafion (trademark) as binder. As the working electrode, there may be used platinum mesh or glassy carbon, for example.

Next, a copper solution is poured into the electrochemical cell. In the copper solution, the working electrode, a reference electrode and a counter electrode are immersed. A copper monatomic layer is deposited on the surface of the palladium-containing particles by Cu-UPD. Concrete examples of the conditions of Cu-UPD are as follows.

Copper solution: a mixed solution of 0.05 mol/L $CuSO_4$ and 0.05 mol/L $H_2SO_4$
Atmosphere: under nitrogen atmosphere
Sweep rate: 0.2 to 0.01 mV/sec
Potential: potential is swept from 0.8 V (vs. RHE) to 0.4 V (vs. RHE) and then fixed at 0.4 V (vs. RHE).
Potential fixing time: 30 minutes After the potential fixing time has passed, the working electrode is immediately immersed in a platinum solution for displacement plating to replace copper with platinum using a difference in ionization tendency. The displacement plating is preferably carried out in an inert gas atmosphere such as nitrogen atmosphere. The platinum solution is not particularly limited; however, there may be used a platinum solution in which $K_2PtCl_4$ is dissolved in 0.1 mol/L, $HClO_4$, for example. The platinum solution is sufficiently agitated, and then nitrogen is bubbled into the solution. The displacement plating time is preferably 90 minutes or more.

Fine catalyst particles can be obtained by the displacement plating, in which a platinum monatomic layer is deposited on the surface of the palladium-containing particles.

The outermost layer can be a layer composed of platinum only, or it may be a layer comprising platinum and other metals. Examples of the other metals include gold, which has a higher standard reduction potential than platinum.

1-4. Step of Bringing the Palladium-Containing Particles Each Covered with the Outermost Layer into Contact with the Acid Solution The time for washing with the acid solution can be optimized based on each condition, such as the ratio of the defective parts in the outermost layer on the surface of the palladium-containing particles, the type, concentration or temperature of the acid solution, etc. An example of the optimization method is a method of confirming the range of increasing activity, the range of maintaining activity, the range of decreasing activity, etc., using evaluation by rotating disk electrode (hereinafter may be referred to as RDE) method. The time for washing with the acid solution is about 30 minutes to 2 hours, for example. Depending on the results of the optimization, the washing time can be extended or shortened.

The method for bringing the palladium-containing particles each covered with the outermost layer into contact with the acid solution, is not particularly limited. However, from the viewpoint of sufficient progression of the acid treatment, it is preferable to immerse the palladium-containing particles in the acid solution.

Preferably, the step of bringing the palladium-containing particles each covered with the outermost layer into contact with the acid solution, is conducted in a condition that the ratio of the mass $M_s$ of the outermost layers eluted by the acid solution divided by the mass $M_c$ of the palladium-containing particles eluted by the acid solution ($M_s/M_c$) is 0.4 to 2.0.

The membrane-electrode assembly produced by a known method with a conventional platinum catalyst, shows a voltage attributed to the platinum catalytic activity confirmed by the RDE evaluation. This is because conventional platinum catalysts are such that the core and shell are, unlike catalysts having the core-shell structure, not composed of different materials and there are no advantages and disadvantages attributed to dissolution of the core.

In a catalyst, having the core-shell structure in which the core is palladium and the shell is platinum, due to a difference in standard electrode potential, the palladium core is more soluble than the platinum shell. In addition, the higher the temperature, the larger the eluted palladium amount. Therefore, when the conventional catalyst having the palladium core-platinum shell structure is used in a fuel cell, the eluted palladium amount may increase with an increase in the operating temperature of the fuel cell. Also, the eluted palladium is retained in the catalyst layer in the form of palladium ions and deposited on the surface of the platinum-containing shell; therefore, there is a decrease in the platinum surface area that can contribute to reaction, possibly resulting in a decrease in the fuel cell voltage.

The inventors of the present invention have found that by acid washing the core-shell structured catalyst in a given condition, an effect of increasing the coverage of platinum on the fine catalyst particles, which is so-called self-healing effect, is exerted in such a manner that the palladium not covered with the outermost layer is eluted from the fine catalyst particles to make the particle diameter of the core particles smaller than that of the core particles prior to the acid washing, and then the core particles are covered again with the outermost layer, thus increasing the coverage of platinum. By this self-healing effect, an increase in the initial activity of the fine catalyst particles (that is, the activity of the fine catalyst particles before they were used in a fuel cell) and inhibition of a decrease in the voltage of the fuel cell comprising the fine catalyst particles, are achieved.

The effect of increasing the coverage of platinum and the catalytic activity increasing effect may not be obtained by merely bringing the fine catalyst particles into contact with the acid solution. Such a disadvantage is caused when, especially in the case of using a slightly acid solution or a low-concentration acid solution, palladium is not eluted from the fine catalyst particles through the defective parts. As will be shown below under "Examples", the acid washing may decrease the catalytic activity and result in a deterioration of the catalyst. Such a disadvantage is caused when, especially in the case of using a strongly acid solution, not only the palladium is eluted through the defective parts, but also the platinum of the outermost layer is eluted.

When the ratio of the mass $M_s$ of the outermost layers eluted by the acid solution divided by the mass $M_c$ of the palladium-containing particles eluted by the acid solution ($M_s/M_c$) is less than 0.4, the amount of eluted palladium-containing particles (core particles) is too large. Accordingly, as a result of too much elution of defective fine catalyst particles, there is a possible decrease in production efficiency. On the other hand, when the ratio ($M_s/M_c$) is more than 2.0, the amount of eluted core particles is too small. Accordingly, a sufficient amount of defective fine catalyst particles may not be eluted, so that the acid washing may not be effective very much. Or, the amount of eluted outermost layers may be too large and may result in catalyst deterioration. The ratio ($M_s/M_c$) is more preferably 0.5 to 1.5.

For example, in the case where the core particles are palladium particles and the outermost layer is a platinum layer, the ratio of the mass of the platinum clutch by the acid solution divided by the mass of the palladium eluted by the acid solution (hereinafter may be referred to as elution ratio (Pt/Pd)) is preferably 0.4 to 2.0, more preferably 0.5 to 1.5.

Examples of methods for setting the ratio ($M_s/M_c$) to 0.4 to 2.0 includes: a method for controlling the concentration of the acid solution used; a method for appropriately selecting the type of the acid solution used; a method for combining two or more kinds of acid solutions and controlling the ratio of the solutions used; a method for controlling the temperature of the acid solution; a method for changing the atmosphere of the acid washing; and a method for controlling the acid washing time. Examples of the method for changing the atmosphere of the acid washing include a method for changing the gas bubbled into the acid solution, such as changing nitrogen to oxygen. For the acid washing time, it is needed to consider that the palladium-containing particles are dissolved at a relatively-rapid rate in the early phase of the acid washing, and the particle dissolution rate gradually decreases with the passing of the acid washing time.

Of the above methods, from the point of view that it is such a simple method that one kind of acid solution is taken and appropriately diluted, preferred is the method for setting the ratio ($M_s/M_c$) to 0.4 to 2.0 by controlling the concentration of the acid solution used. As will be shown below under "Examples", for example, in the case of using nitric acid in the acid washing, the nitric acid concentration is preferably $10^{-4}$ to 2 M (mol/L), more preferably $10^{-3}$ to 1 M (mol/L), still more preferably $10^{-2}$ to $10^{-1}$ M (mol/L).

It is known that the palladium elution potential is 0.915 V (vs. SHE) and the platinum elution potential is 1.188 V (vs. SHE). However, these elution potential values are values when the metals are bulk metals. Since the fine catalyst particles actually used in a fuel cell are particles of a few to tens of nanometers; therefore, the actual palladium and platinum elution potentials are lower than the above potentials. Therefore, even in the case of setting the ratio ($M_s/M_c$) to 0.4 to 2.0, it is more preferable to consider the amount of actually eluted core particles and that of the actually eluted outermost layers, rather than to estimate the ratio ($M_s/M_c$) from the difference between the known elution potentials mentioned above.

As described above, when the fine catalyst particles are used in a fuel cell, dispersion of palladium ions in the fuel cell can be inhibited by eluting in advance with the acid solution the palladium exposed on the surface of the fine catalyst particles through the defective parts of the outermost layer. As a result, the fuel cell in which no voltage decrease is caused by high temperature operation, is obtained.

1-5. Other Steps

Drying of the fine catalyst particles may be conducted after the acid treatment step.

The method for drying the fine catalyst particles is not particularly limited as long as it can remove solvent, etc. An example of the drying method is such that vacuum drying is conducted at room temperature for 0.5 to 2 hours; thereafter, drying is conducted at a temperature of 40 to 60° C. for 1 to 4 hours.

After the acid treatment step, the fine catalyst particles can be supported by a carrier. The applicable carrier is not particularly limited as long as: it has a specific surface area sufficient to support the fine catalyst particles in a highly dispersed state; it has electroconductivity sufficient as a current collector; and it can decrease electrical resistance. Concrete examples thereof include the below-described carbon carrier and metallic materials such as metallic particles and fibers.

The fine catalyst particles obtained by the production method of the present invention are preferably such that the coverage of the outermost layer on the core particle is 0.95 to 1, from the viewpoint of being able to inhibit further palladium elution when used.

If the coverage of the outermost layer on the core particle is less than 0.95, those constituting the core particle, such as palladium, may be eluted in an electrochemical reaction; therefore, the fine catalyst particles may be deteriorated.

"Coverage of the outermost layer on the core particle" means the ratio of the surface area of the core particle, which is covered with the outermost layer, provided that the total surface area of the core particle is 1. Examples of methods for calculating the coverage include a method in which several parts of the surface of the fine catalyst particles are observed by TEM to calculate the ratio of the area where the core particle is observed to be covered with the outermost layer to the total observed area.

The fine catalyst particles obtained by the production method of the present invention are preferably such that the outermost layer is a monatomic layer. Such fine particles are advantageous in that the outermost layer provides extremely high catalyst performance, compared to core-shell catalysts having an outermost layer composed of two or more atomic layers; moreover, such fine particles are advantageous in that the material cost is low because the coverage of the outermost layer on the particles is small.

The average particle diameter of the fine catalyst particles obtained by the production method of the present invention is 4 to 40 nm, preferably 5 to 10 nm.

2. Method for Producing Carbon-Supported Fine Catalyst Particles

The method for producing the carbon-supported fine catalyst particles according to the present invention, is a method for producing carbon-supported fine catalyst particles each comprising a core particle and an outermost layer, the core particle containing palladium and the outermost layer containing platinum and covering the core particle, the method comprising the steps of: preparing palladium-containing particles each supported by a carbon carrier; preparing an acid solution configured to dissolve palladium more preferentially than platinum; covering each palladium-containing particle supported by the carbon carrier with an outermost layer containing platinum; and bringing the palladium-containing particles each supported by the carbon carrier and covered with the outermost layer into contact with the acid solution.

The present invention differ from the above-described fine catalyst particles production method in that palladium-containing particles each supported by a carbon carrier (hereinafter may be referred to as carbon-supported palladium-containing particles) are used in the present invention as a raw material.

The present invention comprises the steps of: (1) preparing carbon-supported palladium-containing particles; (2) preparing an acid solution; (3) covering each carbon-supported palladium-containing particle with an outermost layer containing platinum; and (4) bringing the carbon-supported palladium-containing particles each covered with the outermost layer into contact with the acid solution. The present invention is not limited to these four steps and may also include the above-described drying step, etc., for example. Of the steps, the steps (2) to (4) are the same as those of the above-described fine catalyst particles production method, except that carbon-supported palladium containing particles are used in place of the palladium-containing particles.

Hereinafter, the step (1) will be explained in detail.

The carbon-supported palladium containing particles used in the present invention may be those previously synthesized or may be a commercially-available product.

The carbon carrier is not particularly limited as long as it has specific surface area sufficient to support the fine catalyst particles in a highly dispersed state, has electroconductivity sufficient as a current collector, and can decrease electrical resistance.

Concrete examples of those that can be used as the carbon carrier include carbon black such as acetylene black, furnace black, carbon black, activated carbon, mesophase carbon, graphite, channel black and thermal black; activated carbon obtained by carbonizing and activating a material containing various carbon atoms; those mainly composed of carbon such as graphitized carbon; carbon fibers; porous carbon fine particles, carbon nanotubes; and porous carbon materials. The carbon carrier preferably has a BET specific surface area of 100 to 2,000 m$^2$/g, more preferably 200 to 1,600 m$^2$/g. When the BET specific surface area is in this range, the fine catalyst particles can be supported in a highly dispersed state. Especially in the present invention, as the carbonaceous material, it is preferable to use carbon black such as acetylene black, furnace black, carbon black, activated carbon, mesophase carbon and graphite. Carriers comprising these carbonaceous materials can support the fine catalyst particles in a highly dispersed state, so that highly active electrocatalysts are obtained.

It is also allowed to control the hydrophilicity/hydrophobicity of the surface of the carrier used or of the used carrier itself, in view of dispersion into an organic or aqueous phase.

The average particle diameter of the carbon-supported palladium-containing particles used in the present invention is determined by the average particle diameter of the carbon carrier. Hereinafter, the carbon-supported palladium-containing particles used in the present invention will be explained, supposing that the palladium-containing particles are used in the catalyst layer of a fuel cell. The average particle diameter of a practical carrier carbon for fuel cells (e.g., Ketjen EC, Vulcan XC-72) is about 30 nm at most. The maximum average particle diameter of catalyst particles that can be supported by the carrier carbon, is about 10 nm, and the number of catalyst particles that can be supported by the carrier carbon is 2. The average particle diameter can be increased further by using carbon particles having an average particle diameter of 30 nm or more; however, this is not preferable since the catalyst layer gets thicker.

3. Method for Producing a Catalyst Mix

The first method for producing the catalyst mix according to the present invention, is a method for producing a catalyst mix comprising the fine catalyst particles produced by the above production method, the method comprising the steps of: preparing an electrolyte, and dispersing and mixing at least the electrolyte and the fine catalyst particles by means of a ball mill configured to use balls made of a material with a lower hardness than that of the material contained in the outermost layer.

The second method for producing the catalyst mix according to the present invention, is a method for producing a catalyst mix comprising the carbon-supported fine catalyst particles produced by the above production method, the method comprising the steps of: preparing an electrolyte, and dispersing and mixing at least the electrolyte and the carbon-supported fine catalyst particles by means of a ball mill configured to use balls made of a material with a lower hardness than that of the material contained in the outermost layer.

In the present invention, "hardness" means mechanical hardness. In the present invention, accordingly, "hardness" includes not only those generally known as hardness such as so-called Mohs hardness and Vickers hardness (so-called scratch strength), but also fracture strength (fracture energy), shear stress, yield stress, etc.

In the present invention, as the indicator of the hardness, there may be mentioned the above-described Mohs hardness scale, for example. The following table 1 is a table listing Mohs hardness 1 to 10 and the type of typical materials corresponding to each hardness. For example, platinum and palladium mentioned in the column of Mohs hardness 4 are not scratched by fluorite, which is a reference material of Mohs hardness 4, and they are scratched by apatite, which is a reference material, of Mohs hardness 5.

TABLE 1

| Mohs Hardness | Type of Materials |
|---|---|
| 1 | Clay, Talc |
| 2 | PTFE, Gypsum, Nylon, Gold (2), Silver (2) |
| 3 | Mica, Halite |
| 4 | Zinc, Copper, Platinum (4.3), Palladium (4.8) |
| 5 | Glass |
| 6 | Hematite, Lime glass, Iridium (6.25) |
| 7 | Quartz, Crystal |
| 8 | Zirconia |
| 9 | Alumina, Sapphire |
| 10 | Diamond |

According to Table 1, platinum has a Mohs hardness of 4.3, which is used in the outermost layer. In the present invention, therefore, when platinum is used in the outermost layer, ball mill balls are needed to have a Mohs hardness of less than 4.3, and they are preferably have a Mohs hardness of less than 4.

As just described, a most appropriate material may be selected and used for ball mill balls, considering the hardness of the material used in the outermost layer. As the material, contained in balls, there may be mentioned PTFE, copper, lead or tin. Ball mill balls may contain two or more kinds of the materials. Also, they may contain Teflon (trademark).

In the present invention, the larger the difference between the hardness of the material contained in the outermost layer and that of the material contained in ball mill balls (hereinafter may be referred to as ball material), the better. For example, with reference to the Mohs hardness scale mentioned above, the material contained in outermost layer may be a material having a Mohs hardness of 4 or more and the ball material may be a material having a Mohs hardness of 2 to 3.

Examples of such a material combination include a combination of platinum (Mohs hardness 4.3) and PTFE (Mohs hardness 2) as the outermost layer and ball material, respectively.

Other combination examples include a combination of Gold (Mohs hardness 2) as the outermost layer and lead (Mohs hardness 1.5) as the ball material; a combination of platinum (Mohs hardness 4.3) as the outermost layer and copper (Mohs hardness 4) as the ball material; and a combination of platinum (Mohs hardness 4.3) as the outermost layer and tin (Mohs hardness 1.8) as the ball material.

The electrolyte used in the present invention is not particularly limited as long as it is an electrolyte that is generally used in fuel cells it is preferably a polyelectrolyte. Examples of polyelectrolytes include fluorine-based polyelectrolytes such as perfluorocarbon sulfonic acid resins represented by Nafion (trademark) and hydrocarbon-based polyelectrolytes obtained by incorporating a protonic acid group (proton conductive group) such as sulfonic acid group, carboxylic acid group, phosphate group or boronic acid group into an engineering plastic such as polyether ether ketone, polyether ketone, polyether sulfone, polyphenylene sulfide, polyphenylene ether or polyparaphenylene or into a hydrocarbon-based polymer such as polyethylene, polypropylene or polystyrene.

Hereinafter, typical examples of the steps will be explained in detail.

First, the above-described fine catalyst particles or carbon-supported fine catalyst particles (hereinafter may be referred to as fine catalyst particles, etc.) and an electrolyte are mixed to prepare a catalyst mix precursor. At this time, it is preferable to add a solvent, appropriately.

The solvent which can be used to prepare the catalyst mix precursor is not particularly limited as long as it is a solvent which does not interfere with catalyst dispersibility and which does not damage the coating structure of the fine catalyst particles and the properties of the electrolyte. Concrete examples of the solvent which can be used to prepare the catalyst mix precursor include water, alcohols such as methanol and ethanol, aqueous solutions thereof and mixed solvents thereof.

The mixing ratio of the electrolyte and the fine catalyst particles, etc., is preferably such that the mass of the electrolyte is 70 to 400% by mass when the mass of the fine catalyst particles, etc., is 100% by mass. In the case where the mass of the electrolyte is less than 70% by mass when the mass of the fine catalyst particles, etc., is 100% by mass, the fine catalyst particles, etc., may not be sufficiently dispersed. In the case where the mass of the electrolyte is more than 400% by mass, the content ratio of the fine catalyst particles, etc., is too small and may result in a failure to serve as a catalyst mix.

In the case of using the solvent, it is preferable that the total mass of the solvent is 1,000 to 3,000% by mass when the mass of the fine catalyst particles, etc., is 100% by mass.

In the case of using the solvent, the fine catalyst particles, etc., the electrolyte and the solvent may be mixed at once. However, it is preferable to mix the fine catalyst particles, etc., and the solvent and then to mix the mixture further with the electrolyte. Especially in the case of using water and a solvent other than water, it is preferable that first the fine catalyst particles, etc., and water are mixed; next, the mixture is mixed with a solvent other than water; then, the mixture is further mixed with the electrolyte. As just described, by mixing the materials through multiple steps, the fine catalyst particles, etc., the solvent and the electrolyte can be sufficiently blended.

Next, the thus-obtained catalyst mix precursor is subjected to ball milling. For the milling, it is preferable to use a planetary ball mill.

The ball milling conditions are determined so as to obtain the desired catalyst mix. For example, in the case of using a planetary ball mill, the catalyst mix precursor and mill balls are put in a pot and ball milling is carried out at a predetermined rotational frequency for a predetermined time. The material constituting the mill balls is the same as explained above.

In the case of planetary ball milling, the rotational frequency of the plate is, for example, preferably in the range of 100 to 1,000 rpm for example, particularly preferably in the range of 300 to 600 rpm. The time for the planetary ball milling is, for example, preferably in the range of 30 minutes to 24 hours, particularly preferably in the range of 1 to 5 hours.

Finally, the content of the pot is filtrated with a mesh or the like to remove the balls, thereby obtaining the catalyst mix of the present invention.

Preferably, the catalyst mix thus obtained has a cumulative particle size distribution (D90) of 10 um or less. In the present invention, "particle size distribution" is a physical value that can be obtained by the Light scattering liquid-borne particle counter defined in JIS B9925, and it shows the particle size and number of particles suspended in a solution. Particle size distribution can be also measured by a laser diffraction/scattering particle size distribution analyzer, etc.

The catalyst mix obtained by the present invention can be used to form the catalyst layer of a fuel, cell, for example. Examples of methods for forming the catalyst layer include a method in which the catalyst mix is applied onto a fuel cell member such as an electrolyte membrane or gas diffusion sheet by coating, spray coating or the like, and appropriately drying the applied catalyst mix.

As just described, because the catalyst mix obtained by the present invention enables the acid-treated catalysts to be applied directly to the electrolyte membrane, sufficient adhesion between the electrolyte membrane and the catalyst layer is obtained and an increase in proton resistance and an interface detachment can be inhibited.

4. Method for Producing an Electrode

The electrode production method of the present invention is a method for producing an electrode comprising an electrocatalyst layer and a gas diffusion layer, the electrocatalyst layer comprising carbon-supported fine catalyst particles each comprising a core particle and an outermost layer, the core particle containing palladium and the outermost layer containing platinum and covering the core particle, the method comprising the steps of: preparing palladium-containing particles each supported by a carbon carrier; preparing an acid solution configured to dissolve palladium more preferentially than platinum; preparing a gas diffusion sheet; covering each palladium-containing particle supported by the carbon carrier with an outermost layer containing platinum; forming an electrocatalyst layer on the gas diffusion sheet, the electrocatalyst layer comprising the palladium-containing particles each supported by the carbon carrier and covered with the outermost layer; and bringing at least the electrocatalyst layer into contact with the acid solution.

The present invention differs from both the above-described method for producing the fine catalyst particles and the above-described method for producing the carbon-supported fine catalyst particles, in that the acid treatment is carried out after forming the electrocatalyst layer.

The present invention comprises the steps of: (1) preparing carbon-supported palladium-containing particles; (2)

preparing an acid solution; (3) preparing a gas diffusion sheet; (4) covering each carbon-supported palladium-containing particle with an outermost layer containing platinum; (5) forming an electrocatalyst layer; and (6) bringing at least the electrocatalyst layer into contact with the acid solution. The present invention is not limited to these six steps and may include, for example, the above-described drying method, in addition to the six steps. Of them, the steps (1), (2) and (4) are the same as those of the above-described method for producing the carbon-supported fine catalyst particles.

Hereinafter, the steps (3), (5) and (6) will be described.

4-1. Step of Preparing the Gas Diffusion Sheet

As the gas diffusion sheet for forming the gas diffusion layer, it is preferable to employ one with gas diffusivity which makes it possible to efficiently supply fuel to the electrocatalyst layer, electroconductivity, and strength which is required of the material constituting the gas diffusion layer. Examples of the gas diffusion sheet used in the present invention includes those made of electroconductive porous materials such as carbonaceous porous materials and metallic porous materials or metallic mesh, the carbonaceous porous materials including carbon paper, carbon cloth and carbon felt, and the metallic porous materials or metallic mesh including those made of metals such as titanium, aluminum, nickel, nickel-chromium alloy, copper, copper alloy, silver, aluminum alloy, zinc alloy, lead alloy, niobium, tantalum, iron, stainless steel, gold and platinum. The electroconductive porous material preferably has a thickness of about 50 to 500 μm.

4-2. Step of Forming the Electrocatalyst Layer

This step is a step of forming the electrocatalyst layer on the above-described gas diffusion sheet, the electrocatalyst layer comprising the palladium-containing particles each supported by the carbon carrier and covered with the outermost layer.

The method for producing the electrocatalyst layer is not particularly limited. For example, the electrocatalyst layer may be formed on the gas diffusion sheet by applying a catalytic ink to a surface of the gas diffusion sheet and drying the applied ink, the ink comprising the palladium-containing particles each supported by the carbon carrier and covered with the outermost layer. Or, the electrocatalyst layer may be formed on a surface of the gas diffusion sheet by a method in which a transfer sheet is produced by applying the catalytic ink to a surface of a transfer substrate and drying the same; the transfer sheet is attached to the gas diffusion sheet by hot pressing or the like; then, a substrate film is removed from the transfer sheet.

To apply the catalytic ink, there may be used a conventionally and widely known application method such as spraying method or bar coating method.

4-3. Step of Bringing the Electrocatalyst Layer into Contact with the Acid Solution The time for washing with the acid solution is the same as explained above.

The method for bringing the electrocatalyst layer into contact with the acid solution is not particularly limited. However, from the viewpoint of sufficient progression of the acid treatment, it is preferable to immerse the whole electrode in the acid solution. If the gas diffusion sheet comprises a material which is susceptible to acid solution, it is preferable to immerse only the electrocatalyst layer in the acid solution.

As just described, by acid treating the whole electrocatalyst layer, particles having defective parts in the outermost layer, which are responsible for palladium elution, can be removed. As shown below under "Examples", catalyst deterioration is not caused by this acid washing, so that only the fine catalyst particles having such defective parts can be selectively removed. Therefore, high discharge performance can be obtained even when a membrane-electrode assembly comprising the electrode obtained by the present invention, is operated at high temperature.

EXAMPLES

1. Synthesis of Carbon-Supported Fine Catalyst Particles 1-1. Formation of Copper Monatomic Layer First, a powder of carbon-supported palladium particles (manufactured by BASF, 20% Pd/C) was taken.

Next, the palladium particles were covered with monatomic copper by Cu-UPD. In particular, first, 0.5 g of the powder of carbon-supported palladium particles and 0.2 g of Nafion (Trademark) were dispersed in water and filtered to obtain a mix paste. The paste was applied to a glassy carbon electrode.

Then, 500 mL of a mixed solution of 0.05 mol/L $CuSO_4$ and 0.05 mol/L $H_2SO_4$, into which nitrogen had been bubbled, was poured into an electrochemical cell. Next, the glassy carbon electrode (working electrode), a reference electrode and a counter electrode were immersed in the mixed solution. At a sweep rate of 0.05 mV/sec, the potential was swept from 0.8 V (vs. RHE) to 0.4 V (vs. RHE); thereafter, the potential was kept at 0.4 V (vs. RHE) for about 30 minutes to deposit a copper monatomic layer on the surface of the palladium particles.

1-2. Formation of a Platinum Monatomic Layer

First, 1 g of $K_2PtCl_4$ was dissolved in 500 mL of 0.1 mol/L $HClO_4$ to prepare a platinum ion solution. The solution was sufficiently agitated to bubble nitrogen into the solution in advance.

After a copper monatomic layer was deposited on the surface of the palladium particles by the method described above under "1-1. Formation of copper monatomic layer", the glassy carbon electrode was immediately immersed in the platinum ion solution under a nitrogen atmosphere. After the electrode was immersed for two hours to deposit a platinum monatomic layer on the surface of the palladium particles, thus obtaining carbon-supported fine catalyst particles.

2. Acid Washing of Carbon-Supported Fine Catalyst Particles

Example 1

The carbon-supported fine catalyst particles obtained by the above-described method were immersed for one hour in 1 M nitric acid at normal temperature (20 to 25° C.). Thereafter, carbon-supported fine catalyst particles were immersed in distilled water for one hour. Then, the carbon-supported fine catalyst particles were collected from the distilled water and dried to obtain the carbon supported fine catalyst particles of Example 1.

Example 2

Carbon-supported fine catalyst particles of Example 2 were obtained in the same manner as Example 1, except that the carbon-supported fine catalyst particles were immersed for 6 hours in 1 M nitric acid at normal temperature (20 to 25° C.).

Comparative Example 1

Carbon-supported fine catalyst particles of Comparative Example 1 were obtained in the same manner as Example 1, except that the carbon-supported fine catalyst particles were immersed for 16 hours in 1 M nitric acid at normal temperature (20 to 25° C.)

Comparative Example 2

Carbon-supported fine catalyst particles of Comparative Example 2 were obtained in the same manner as Example 1, except that the carbon-supported fine catalyst particles were immersed for 24 hours in 1 M nitric acid at normal temperature (20 to 25° C.).

3. Evaluation of Carbon-Supported Fine Catalyst Particles 3-1. Evaluation of Catalytic Activity An electrode was produced with the acid-washed carbon-supported fine catalyst particles of each of Examples 1 and 2 and Comparative Examples 1 and 2. The electrodes thus produced were evaluated for catalytic activity.

In particular, first, the acid-washed carbon-supported fine catalyst particles, ultrapure water and ethanol were mixed at a ratio of 6:1:4 (carbon-supported fine catalyst particles:ultrapure water:ethanol). The mixture was further mixed with a slight amount of ionomers and then subjected to ultrasonic dispersion for 5 minutes. Next, 10 μL of the mixture was applied to a rotating disk electrode and dried naturally.

The thus-obtained rotating disk electrode was placed in an electrochemical cell. A reference electrode and a liquid electrolyte were also put in the electrochemical cell. A hydrogen reference electrode and 0.1 M perchloric acid were used as the reference electrode and liquid electrolyte, respectively. The measurement temperature was set to 25° C.

The evaluation method is as follows.

First, using a liquid electrolyte saturated with argon, cyclic-voltammograms (hereinafter may be referred to as CV) were obtained. The potential was set in the range of 50 to 1,100 mV. The scan rate was set to 100 mV/s. CV cycles were repeated until the waveform is stabilized. The electrochemical surface area was calculated from the waveform at the finally stabilized stage.

Next, using a liquid electrolyte saturated with oxygen, oxygen reduction reaction (ORR) cycles were obtained. The potential was set in the range of 100 mV to OCP. The scan rate was set to 10 mV/s. The rotational frequency was set to 1,600 rpm. ORR cycles were repeated until the waveform is stabilized. The current value was read from the waveform at the finally stabilized stage to calculate the activity.

3-2. Measurement of Eluted Palladium Amount

For the acid-washed carbon-supported fine catalyst particles of each of Examples 1, Example 2, Comparative Example 1 and Comparative Example 2, the eluted palladium amount was measured. First, the acid-washed carbon-supported fine catalyst particles and 1 M-HNO$_3$ at 15 to 25° C. were mixed at a ratio of 2:3. The acid-washed carbon-supported fine catalyst particles were immersed in 1 M-HNO$_3$ for a given amount of time. Then, the nitric acid was collected and analyzed for the amount of palladium contained in the nitric acid by inductively coupled plasma mass spectrometry (ICP-MS).

3-3. Evaluation Results of Carbon-Supported Fine Catalyst Particles

FIG. 1 is a graph showing the catalytic activity and the clutch palladium amount for the acid-washed carbon-supported fine catalyst particles of each of Examples 1 and 2 and Comparative Examples 1 and 2. FIG. 1 is a graph with the nitric acid-washing time (h) on the abscissa, the catalytic activity (μA/cm$^2$) on the left ordinate, and the eluted palladium amount (% by mass) on the right ordinate. In FIG. 1, triangles show catalytic activity values, and diamonds show values of eluted palladium amounts. Also in FIG. 1, the black thick line at 200 μA/cm$^2$ shows the activity of a catalyst not washed with acid.

As is clear from FIG. 1, for the carbon-supported fine catalyst particles of Comparative Examples 1 and 2, which were washed with nitric acid for 16 hours or more, the clutch palladium amount is more than 3.5% by mass, while the catalytic activity is as low as less than 160 μA/cm$^2$.

In contrast, for the carbon-supported fine catalyst particles of Examples 1 and 2, which were washed with nitric acid for 6 hours or less, the eluted palladium amount is kept under 3.0% by mass, and the catalytic activity is more than 170 μA/cm$^2$. Especially for Example 1, which was washed with nitric acid for 1 hour, it is clear that the catalytic activity is equivalent to that of the catalyst not washed with acid, while the eluted palladium amount is kept under 2.0% by mass.

4. Preparation of a Catalytic Ink 4-1. Preparation of a Catalytic Ink Using Acid-Washed Carbon-Supported Fine Catalyst Particles Example 3

First, 0.9 g of the acid-washed carbon-supported fine catalyst particles of Example 1 and 14.24 g of water were mixed by centrifugal agitation to blend them together. Next, 8.16 g of ethanol was added to the mixture, and the mixture was uniformly mixed by centrifugal agitation, as well. In addition, 1.9 g of an electrolyte (DE2020CS manufactured by DuPont) was added to the mixture, and the mixture was uniformly mixed by centrifugal agitation as well to obtain a raw material for the catalytic ink.

Under a dry atmosphere, 20 mL of the raw material for the catalytic ink and 63 g of PTFE grinding balls (φ=2.4 mm) were put in a PTFE pot, and the pot was hermetically closed. Thereafter, the pot was installed in a planetary ball mill and subjected to mechanical milling in the following conditions: plate rotational frequency 600 rpm, temperature 20° C., and treatment time 1 hour.

After the mechanical milling, the mixture in the pot was filtered through a mesh to remove the balls, thereby obtaining the catalytic ink of Example 3.

4-2. Preparation of a Catalytic Ink Using Carbon-Supported Fine Catalyst Particles not Treated with Acid Example 4

First, 0.9 g of carbon-supported fine catalyst particles not treated with acid solution, the particles having been described above under "1. Synthesis of carbon-supported fine catalyst particles", and 14.24 g of water were mixed by centrifugal agitation to blend them together. Next, 8.16 g of ethanol was added to the mixture, and the mixture was uniformly blended by centrifugal agitation, as well. In addition, 1.9 g of an electrolyte (DE2020CS manufactured by DuPont) was added to the mixture, and the mixture was uniformly mixed by centrifugal agitation, as well. Moreover, the mixture was dispersed by an indirect homogenizer for 30 minutes to obtain the catalytic ink of Example 4.

5. Formation of a Membrane-Catalyst Layer Assembly

Example 5

The catalytic ink of Example 3 was filled into a spray gun (Spectrum S-920N manufactured by Nordson) and applied to a surface of an electrolyte membrane (NR211 manufactured by DuPont) in a catalytic amount of 300 to 500 µg/cm$^2$ to obtain the membrane-catalyst layer assembly of Example 5.

6. Production of an Electrode

Example 6

The catalytic ink (not treated with acid) of Example 4 was filled into a spray gun (Spectrum S-920N manufactured by Nordson) and applied to a surface of a gas diffusion sheet (PYROFIL manufactured by Mitsubishi Rayon Co., Ltd.) in a catalytic amount of 300 to 500 µg/cm$^2$ to obtain an electrode.

The thus-obtained electrode was immersed for one hour in 1 M nitric acid at normal temperature (20 to 25° C.). Thereafter, the electrode was immersed for one hour in distilled water. Then, the electrode was collected from the distilled water and dried to obtain the acid-washed electrode of Example 6

Comparative Example 3

The electrode of Comparative Example 3 was obtained in the same manner as Example 6, except that no acid washing was carried out.

7. Production of a Membrane-Electrode Laminate

Example 7

An anode catalyst paste comprising a platinum-supported carbon (TEC10E50E manufactured by Tanaka Kikinzoku Kogyo K. K.) and an electrolyte (DE2020CS manufactured by DuPont) was applied to a surface of the membrane-catalyst layer assembly of Example 5, the surface having no cathode catalyst layer formed thereon, to form an anode catalyst layer. Then, the membrane-catalyst layer assembly having the anode catalyst layer formed thereon, was sandwiched by a pair of gas diffusion sheets (PYROFIL manufactured by Mitsubishi Rayon Co., Ltd.) and pressure-bonded to obtain the membrane electrode laminate of Example 7.

Example 8

First, the same anode catalyst paste as Example 7 was applied to a surface of a gas diffusion sheet (PYROFIL manufactured by Mitsubishi Rayon Co., Ltd.) and dried to produce an anode electrode. Thereafter, the acid-washed electrode of Example 6, an electrolyte membrane (NR211 manufactured by DuPont) and the anode electrode were stacked to be in the following order: gas diffusion sheet/acid-washed electrocatalyst layer/electrolyte membrane/anode catalyst layer/gas diffusion sheet. Therefore, the membrane-electrode laminate of Example 8 was obtained.

Comparative Example 4

The membrane-electrode laminate of Comparative Example 4 was obtained in the same manner as Example 8, except that the electrode not treated with acid of Comparative Example 3, was used in place of the acid-washed electrode of Example 6, and the following components were stacked to be in the following order: gas diffusion sheet/electrocatalyst layer not treated with acid/electrolyte membrane/anode catalyst layer/gas diffusion sheet.

Comparative Example 5

A catalyst paste comprising a platinum-supported carbon conventionally used in fuel cells (TEC10E50E manufactured by Tanaka Kikinzoku Kogyo K. K.) and an electrolyte (DE2020CS manufactured by DuPont) was applied to a surface of a gas diffusion sheet (PYROFIL manufactured by Mitsubishi Rayon Co., Ltd.) and dried to obtain a cathode electrode. Next, an anode electrode was produced in the same manner as Example 8. Thereafter, the cathode electrode, an electrolyte membrane (NR211 manufactured by DuPont) and the anode electrode were stacked to be in the following order: gas diffusion sheet/cathode catalyst layer/electrolyte membrane/anode catalyst layer/gas diffusion sheet. Therefore, the membrane-electrode laminate of Comparative Example 5 was obtained.

Comparative Example 6

A platinum-supported carbon (TEC10E50E manufactured by Tanaka Kikinzoku Kogyo K. K.) and a palladium-supported carbon (TECPd (ONLY) E20 manufactured by Tanaka Kikinzoku Kogyo K. K.) were mixed at a mass ratio of 1:1 to obtain a catalyst mixture. A catalyst paste comprising the catalyst mixture and an electrolyte (DE2020CS manufactured by DuPont) was applied to a surface of a gas diffusion sheet (PYROFIL manufactured by Mitsubishi Rayon Co., Ltd.) and dried to obtain a cathode electrode. Next, an anode electrode was produced in the same manner as Example 8. Thereafter, the cathode electrode, an electrolyte membrane (NR211 manufactured by DuPont) and the anode electrode were stacked to be in the following order: gas diffusion sheet/cathode catalyst layer/electrolyte membrane/anode catalyst layer/gas diffusion sheet. Therefore, the membrane-electrode laminate of Comparative Example 6 was obtained.

8. Evaluation of Discharge Performance of Membrane-Electrode Laminates

For the membrane-electrode laminate of each of Example 7, Example 8 and Comparative Examples 4 to 6, the discharge performance was evaluated. Details of the evaluation are as follows.

Measurement system: 1 kW module evaluation system (FCT-01W manufactured by ESPEC Corp.)
Temperature: 40° C. and 80° C.
Potential control: 2 mV/sec
Anode gas: Hydrogen gas Cathode gas: Air
Humidification condition: Full humidification FIG. 8 is a bar graph comparing the voltage value for the membrane-electrode laminate of Comparative Example 5 and that for the membrane-electrode laminate of Comparative Example 6, at a current density of 0.2 A/cm$^2$.

Figure 8:
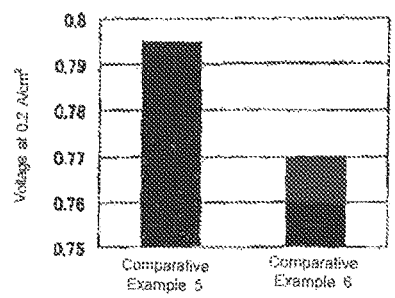
FIG. 8 is a bar graph comparing the voltage value for the membrane-electrode laminate of Comparative Example 5 and that for the membrane-electrode laminate of Comparative Example 6, at a current density 0.2 A/cm$^2$.

As is clear from FIG. 8, the voltage value of the membrane-electrode laminate of Comparative Example 5, comprising a conventional platinum-supported carbon, is 0.02 V hither than that of the membrane-electrode laminate of Comparative Example 6, comprising the mixture of the platinum-supported carbon and the palladium-supported carbon. Therefore, it is clear that in the case of just mixing a palladium-supported carbon and a platinum-supported carbon and simply using the mixture, the discharge performance is inferior to the case of using a conventional platinum-supported carbon. This is thought to be because palladium elution occurred during discharge and resulted in a decrease in catalytic activity.

Figure 2:
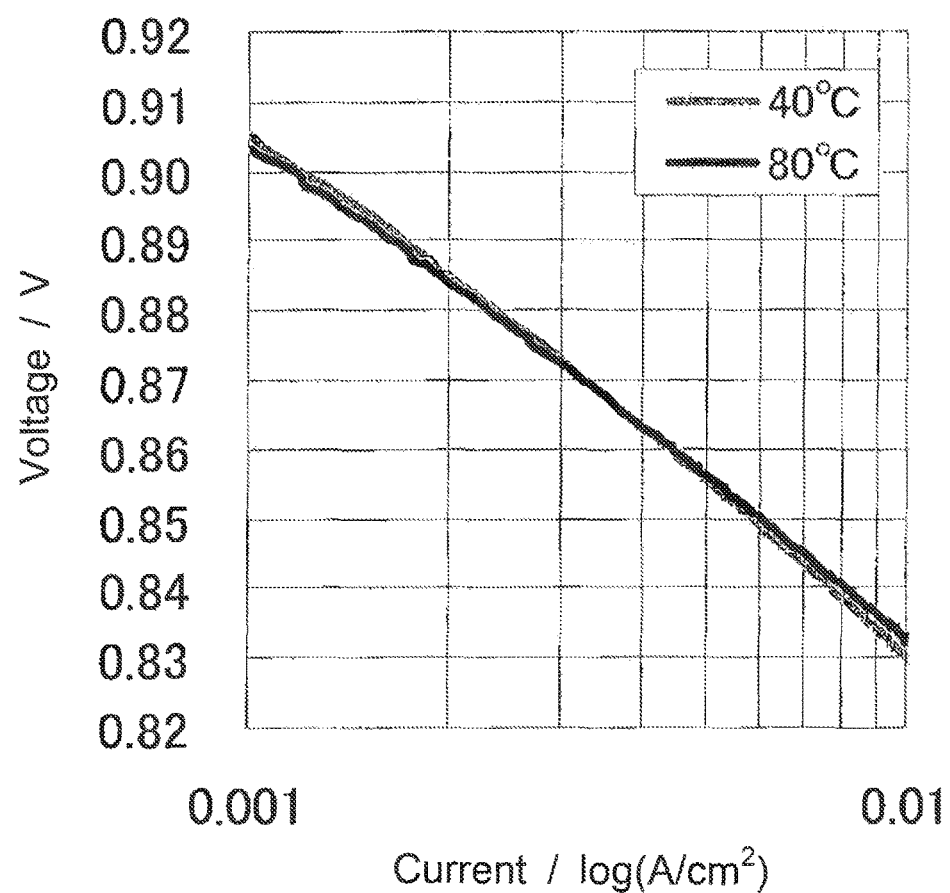
FIG. 2 is a graph showing the discharge curves for the membrane-electrode laminate of Example 8.
Figure 9:
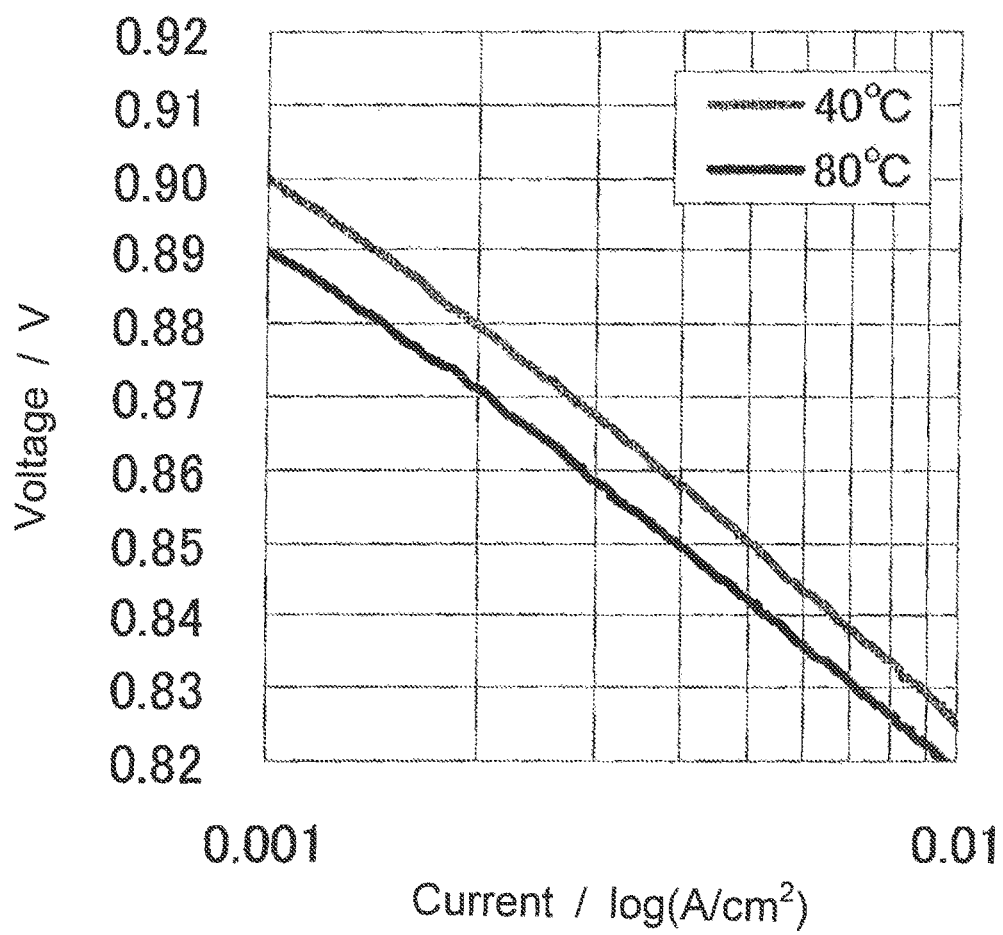
FIG. 9 is a graph showing the discharge curves for the membrane-electrode laminate of Comparative Example 4.

FIG. 2 is a graph showing the discharge curves for the membrane-electrode laminate of Example 8, FIG. 9 is a graph showing the discharge curves for the membrane-electrode laminate of Comparative Example 4. Both of the graphs are those with the logarithm of current density (log(A/cm$^2$)) on the abscissa and voltage (V) on the ordinate.

As is clear from FIG. 9, the result of discharge at 80° C. of the membrane-electrode laminate of Comparative Example 4, which was not subjected to any acid washing, is about 0.01 V lower in voltage than the result of discharge at 40° C. Meanwhile, as is clear from FIG. 2, there is almost no difference between the result of discharge at 80° C. of the membrane-electrode laminate of Example 8, the laminate comprising the acid-washed electrode, and the result of discharge at 40° C.

In the carbon-supported fine catalyst particles used in Comparative Example 4, palladium was used for the core particle, which is more soluble than platinum, and the particles were not subjected to any acid washing. Therefore, in the carbon-supported fine catalyst particles used in Comparative Example 4, there are defective parts on the surface of the palladium core particle, which are not covered with the platinum outermost layer, and the palladium is eluted through the defective parts especially at high temperature. Also, it is thought that the eluted palladium ions are redeposited on the platinum outermost layer to decrease the catalytic activity of the platinum. Therefore, FIG. 9 suggests that in the membrane-electrode laminate of Comparative Example 4, which was not subjected to any acid washing, a large amount of palladium was eluted at least at a temperature of 80° C.

Meanwhile, from the electrode used in Example 8, only the fine catalyst particles having the defective parts had been removed beforehand by the acid washing, thus reducing palladium ion elution. Therefore, as shown in FIG. 2, there is no decrease in the discharge performance of the membrane electrode laminate of Example 8, the laminate comprising the acid-washed electrode, even at a temperature of 80° C.

Figure 3:
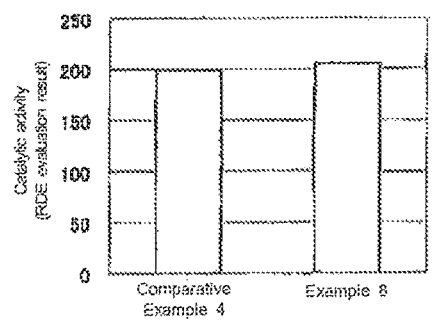
FIG. 3 is a bar graph comparing the catalytic activity for the membrane-electrode laminate of Example 8 and that for the membrane-electrode laminate of Comparative Example 4, which are based on RDE evaluation results.

FIG. 3 is a bar graph comparing the catalytic activity for the membrane-electrode laminate of Example 8 and that for the membrane-electrode laminate of Comparative Example 4, which are based on RDE evaluation results. As is clear from FIG. 3, the catalytic activity of Example 8, which comprises the acid-washed electrode, is almost no different from the catalytic activity of Comparative Example 4 which was not subjected to any acid washing. This result shows that there is almost no influence on the catalytic activity even when acid washing is carried out beforehand.

Figure 4:
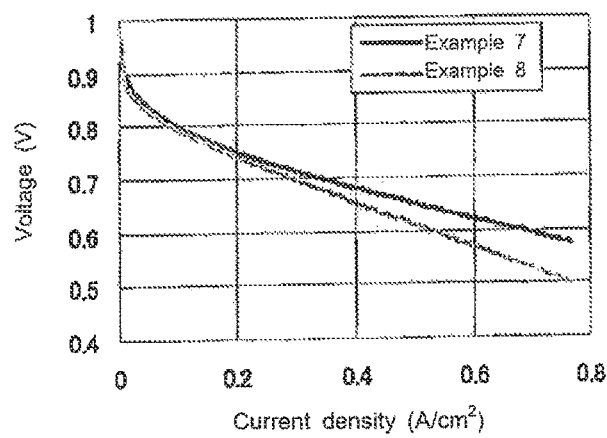
FIG. 4 is a graph showing the discharge curve for the membrane-electrode laminate of Example 7 and that for the membrane-electrode laminate of Example 8.

FIG. 4 is a graph showing the discharge curve for the membrane-electrode laminate of Example 7 and that for the membrane-electrode laminate of Example 8. Both of the graphs are those with current density (A/cm$^2$) on the abscissa and voltage (V) on the ordinate. Also, both of the graphs are those of the discharge curve at a temperature of 80° C.

As is clear from FIG. 4, the larger the current density, the larger the difference in voltage between the membrane-electrode laminate of Example 7 comprising the acid-washed carbon-supported fine catalyst particles and the membrane-electrode laminate of Example 8 comprising the acid-washed electrode. In particular, the difference between the voltages exceeds 0.05 V at 0.7 A/cm$^2$.

From the discharge test results of the membrane-electrode laminates of Examples 7 and 8, it is clear that in the case of using the carbon-supported fine catalyst particles directly washed with acid, proton resistance can be kept lower than in the case of using acid-washed electrode. This result indicates that because the membrane-electrode laminate of Example 7 was produced by directly applying the acid-washed catalyst to the electrolyte membrane, sufficient adhesion between the electrolyte membrane and catalyst layer is secured and an increase in proton resistance and an interface detachment can be inhibited. In addition, this result indicates that the membrane-electrode laminate of Example 7 prevents the occurrence of mass transport limitations, which is associated with an increase in proton resistance on high current density side, and it can prevent a decrease in discharge performance.

9. Consideration of Acid Washing Conditions for Fine Catalyst Particles 9-1. Production of Samples Example 9

Carbon-supported fine catalyst particles of Example were obtained in the same manner as Example 1, except that the concentration of the nitric acid used for the acid washing was changed from 1 M (1 mol/L) to 2 M (2 mol/L), Example 10

Carbon-supported fine catalyst particles of Example 10 sere obtained in the same manner as Example 1, except that the concentration of the nitric acid used for the acid washing was changed from 1 M (1 mol/L) to 10$^{-1}$ M (10$^{-1}$ mol/L)

Example 11

Carbon-supported fine catalyst particles of Example 11 were obtained in the same manner as Example 1, except that the concentration of the nitric acid used for the acid washing was changed from 1 M (1 mol/L) to 10$^{-2}$ M (10$^{-2}$ mol/L).

Example 12

Carbon-supported fine catalyst particles of Example 12 were obtained in the same manner as Example 1, except that the concentration of the nitric acid used for the acid washing was changed from 1 M (1 mol/L) to 10$^{-3}$ M (10$^{-3}$ mol/L).

Example 13

Carbon-supported fine catalyst particles of Example 13 were obtained in the same manner as Example 1, except that the concentration of the nitric acid used for the acid washing was changed from 1 M (1 mol/L) to $10^{-4}$ M ($10^{-4}$ mol/L)

9-2. Evaluation of Catalytic Activity

An electrode was produced with the acid-washed carbon-supported fine catalyst particles of each of Examples 9 to 13. The electrodes thus produced were evaluated for catalytic activity. The catalytic activity evaluation method is the same as the method explained above under "3-1. Evaluation of catalytic activity".

9-3. Measurement of Eluted Palladium Amount and Eluted Platinum Amount (15 to 25° C.)

For the acid-washed carbon-supported fine catalyst particles of each of Examples 9 to 13, the eluted palladium amount was measured. The method for measuring the eluted palladium amount is the same as the method explained above under "3-2. Measurement of eluted palladium amount".

For the acid-washed carbon-supported fine catalyst particles of each of Examples 1 and 9 to 13, the eluted platinum amount was measured. First, the acid-washed carbon-supported fine catalyst particles and 1 M-HNO$_3$ at 15 to 25° C. were mixed at a ratio of 2:3. The acid-washed carbon-supported fine catalyst particles were immersed in 1 M-HNO$_3$ for a given amount of time. Then, the nitric acid was collected and analyzed for the amount of platinum contained in the nitric acid by ICP-MS.

9-4. Measurement of Eluted Palladium Amount and Eluted Platinum Amount (80° C.)

For the acid-washed carbon-supported fine catalyst particles of Example 1 and the carbon-supported fine catalyst particles used as a raw material and not washed with acid, the eluted palladium and platinum amounts were measured in the same manner as the above measurement method, using 0.1 M-H$_2$SO$_4$ at 80° C.

9-5. Summary of Acid Washing Conditions for Fine Catalyst Particles

Figure 5:
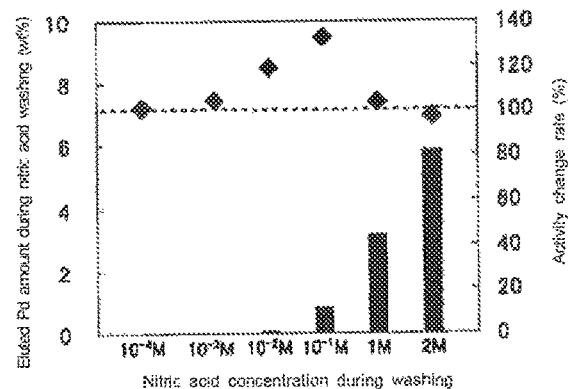
FIG. 5 is a graph showing the relationship between the concentration of nitric acid used for acid washing, the eluted palladium amount and the activity change rate for the acid-washed carbon-supported fine catalyst particles of each of Examples 1 and 9 to 13.

FIG. 5 is a graph showing the relationship between the concentration of the nitric acid used for the acid washing, the eluted palladium amount and the activity change rate for the acid-washed carbon-supported fine catalyst particles of each of Examples 1 and 9 to 13. FIG. 5 is a graph with the concentration (M) of the nitric acid used for the acid washing on the abscissa, the eluted palladium amount (% by mass) in the acid washing on the left ordinate, and the activity change rate (%) on the right ordinate. In FIG. 5, each lozenge indicates the value of activity change rate, and each bar indicates the value of eluted palladium amount. The activity change rate is a value obtained by dividing the measured catalytic activity (μA/cm$^2$) by the activity (μA/cm$^2$) of the catalyst not washed with acid and then multiplying the resultant by 100. Accordingly, the dashed line shown in FIG. 5 at an activity change rate of 100%, indicates that the evaluation sample has an activity that is equal to the activity of the catalyst not washed with acid.

As is clear from FIG. 5, the higher the nitric acid concentration, the larger the eluted palladium amount. Therefore, it is clear that when the concentration of the acid solution is too low, the acid washing may not be effective and may result in a failure in absolute removal of defective fine catalyst particles.

Meanwhile, the higher the nitric acid concentration, the higher the activity change rate. However, after reaching its peak (132%) when using $10^{-1}$ M nitric acid, the activity change rate decreases with an increase in the nitric acid concentration. This result indicates that when the concentration of the acid solution is too high, the destruction of the outermost layer containing platinum is promoted simultaneously with the effects of the acid washing, and not only defective fine catalyst particles are removed but also non-defective fine catalyst particles may become defective.

Figure 6:
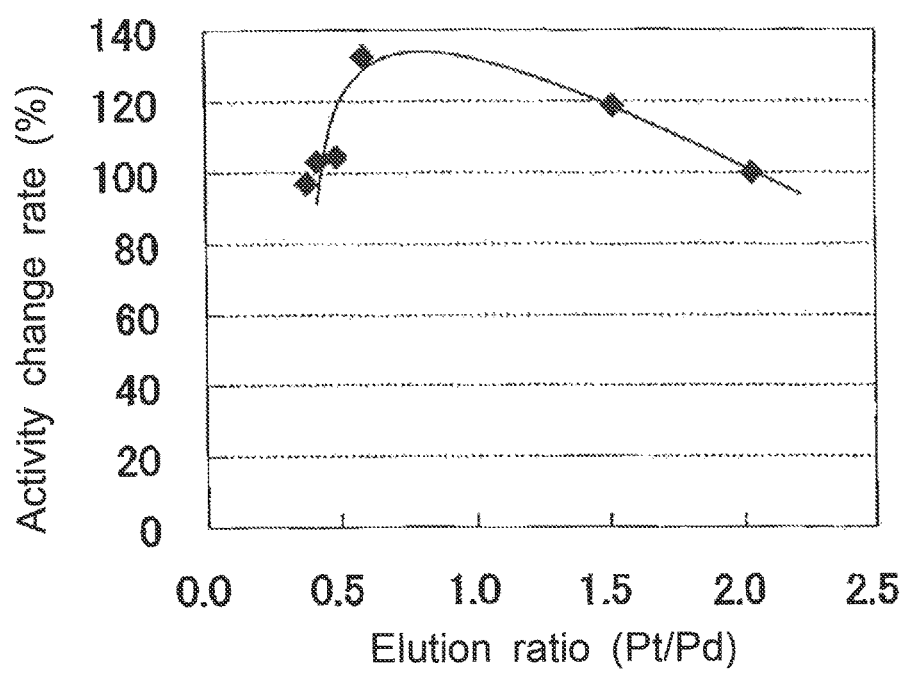
FIG. 6 is a graph showing the relationship between the activity change rate and the ratio of the eluted platinum amount divided by the eluted palladium amount (elution ratio (Pt/Pd)) for the acid-washed carbon-supported fine catalyst particles of each of Examples 1 and 9 to 13 (15 to 25° C.).

FIG. 6 is a graph showing the relationship between the activity change rate and the ratio of the eluted platinum amount divided by the eluted palladium amount (hereinafter referred to as elution ratio (Pt/Pd)) for the acid-washed carbon-supported fine catalyst particles of each of Examples 1 and 9 to 13 (15 to 25° C.). FIG. 6 is a graph with the elution ratio (Pt/Pd) (%) on the abscissa and the activity change rate (%) on the ordinate.

As shown in FIG. 6, when the elution ratio (Pt/Pd) is 0.40 (nitric acid concentration 2 M, Example 9), the activity change rate is 96%. When the elution ratio (Pt/Pd) is 0.45 (nitric acid concentration 1 M, Example 1), the activity change rate is 103%. When the elution ratio (Pt/Pd) is 0.60 (nitric acid concentration $10^{-1}$ M, Example 10), the activity change rate is 132%. When the elution ratio (Pt/Pd) is 1.5 (nitric acid concentration $10^{-2}$ M, Example 11), the activity change rate is 118%. When the elution ratio (Pt/Pd) is 2.0 (nitric acid concentration $10^{-4}$ M, Example 13), the activity change rate is 100%. It is also estimated from FIG. 6 that when the elution ratio (Pt/Pd) is less than 0.40 or more than 2.0, the activity change rate is less than 100%.

Therefore, it is clear that when the elution ratio (Pt/Pd), that is, the ratio of the mass $M_s$ of the outermost layers eluted by the acid solution divided by the mass $M_c$ of the palladium-containing particles eluted by the acid solution ($M_s/M_c$) is 0.4 to 2.0, the activity change rate is 100% or more and the effects of the acid washing can be sufficiently received.

Figure 7:
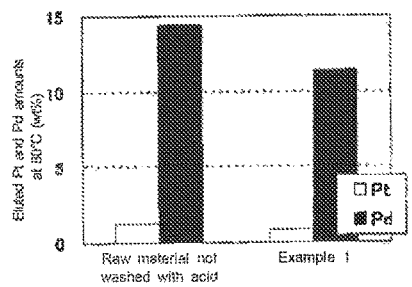
FIG. 7 is a bar graph comparing the eluted palladium and platinum amounts for the acid-washed carbon-supported fine catalyst particles of Example 1 and those for the carbon-supported fine catalyst particles used as a raw material and not washed with acid, in the case of using 0.1 M-$H_2SO_4$ at 80° C.

FIG. 7 is a bar graph comparing the eluted palladium and platinum amounts for the acid-washed carbon-supported fine catalyst particles of Example 1 and those for the carbon-supported fine catalyst particles used as a raw material and not washed with acid, in the case of using 0.1 M-H$_2$SO$_4$ at 80° C. In this bar graph, the white bar is a bar indicating the eluted platinum amount, and the black bar is a bar indicating the eluted palladium amount.

FIG. 7 shows that for the raw material not washed with acid, the eluted platinum amount is 1.2% by mass and the eluted palladium amount is 14.4% by mass. Meanwhile, for Example 1, the eluted platinum amount is 0.8% by mass, and the eluted palladium amount is 11.3% by mass. Therefore, it has been proved that at 80° C., which is a temperature that is in the normal fuel cell operating temperature range, both the amount of platinum eluted from the acid-washed fine catalyst particles and the amount of palladium eluted from the same particles, are smaller than the fine catalyst particles not washed with acid, so that the acid-washed fine catalyst particles have high durability.

The invention claimed is:

1. A method for producing a membrane electrode laminate comprising a membrane electrode assembly disposed between a pair of gas diffusion sheets, the membrane electrode assembly comprising a cathode catalyst layer, an anode catalyst layer, and an electrolyte membrane disposed between the cathode catalyst layer and the anode catalyst layer, the cathode catalyst layer containing carbon-supported fine catalyst particles each comprising a core particle and an outermost layer, the core particle containing palladium and the outermost layer containing platinum and covering the core particle, the method comprising:
preparing palladium-containing particles each supported by a carbon carrier;
preparing nitric acid having a concentration of $10^2$ mol/L and a temperature of 20° C. to 25° C.;
covering each palladium-containing particle supported by the carbon carrier with an outermost layer containing platinum;
bringing the palladium-containing particles each supported by the carbon carrier and covered with the outermost layer into contact with the nitric acid for one hour;
washing at least the palladium-containing particles with water to remove the nitric acid from at least the palladium-containing particles; and
forming the cathode catalyst layer on the electrolyte membrane after the step of washing at least the palladium-containing particles with water, the cathode catalyst layer containing the palladium-containing particles each supported by the carbon carrier and covered with the outermost layer,
wherein the step of bringing the palladium-containing particles each supported by the carbon carrier and covered with the outermost layer into contact with the nitric acid is conducted in a condition that a ratio of the mass Ms of the outermost layers eluted by the nitric acid divided by the mass Mc of the palladium-containing particles eluted by the nitric acid (Ms/Mc) is 1.5.

2. A method for producing the membrane electrode laminate according to claim 1, the method comprising steps of:

preparing an electrolyte before the step of forming the cathode catalyst layer, and dispersing and mixing at least the electrolyte and the carbon-supported fine catalyst particles by means of a ball mill configured to use balls made of a material with a lower hardness than that of the material contained in the outermost layer.

3. A method for producing an electrode comprising an electrocatalyst layer and a gas diffusion layer, the electrocatalyst layer comprising carbon-supported fine catalyst particles each comprising a core particle and an outermost layer, the core particle containing palladium and the outermost layer containing platinum and covering the core particle, the method comprising steps of:
preparing palladium-containing particles each supported by a carbon carrier; preparing nitric acid having a concentration of $10^2$ mol/L and a temperature of 20° C. to 25° C.;
preparing a gas diffusion sheet;
covering each palladium-containing particle supported by the carbon carrier with an outermost layer containing platinum;
forming an electrocatalyst layer on the gas diffusion sheet, the electrocatalyst layer comprising the palladium-containing particles each supported by the carbon carrier and covered with the outermost layer;
bringing at least the electrocatalyst layer into contact with the nitric acid for 1 one hour; and
washing at least the electrocatalyst layer with water to remove the nitric acid from at least the electrocatalyst layer,
wherein the step of bringing the electrocatalyst layer into contact with the nitric acid is conducted in a condition that a ratio of the mass Ms of the outermost layers eluted by the acid solution divided by the mass Mc of the palladium-containing particles eluted by the nitric acid (Ms/Mc) is 1.5.

* * * * *